United States Patent
Narama

[19]

[11] Patent Number: 6,141,207
[45] Date of Patent: Oct. 31, 2000

[54] ILLUMINATED COMBINATION METER

[75] Inventor: Shinji Narama, Shizuoka-ken, Japan

[73] Assignee: Yazaki Corporation, Tokyo, Japan

[21] Appl. No.: 09/226,067

[22] Filed: Jan. 6, 1999

[30] Foreign Application Priority Data

Jan. 7, 1998 [JP] Japan .................................. 10-001757

[51] Int. Cl.$^7$ .................................................. H02B 1/10
[52] U.S. Cl. ........................ 361/659; 361/647; 361/659; 361/732; 361/735; 362/27; 362/23; 362/30; 307/9.1; 307/10.1
[58] Field of Search ..................... 361/659, 647, 361/732, 735, 748, 752, 285; 73/866.3, 499, 488; 116/62.4, 286, 62.1, 815.15; 340/815.15, 52 F, 815.02, 815.06, 815.2, 702, 461; 362/23, 27, 29, 30, 800, 234, 231, 31, 26, 236; 180/90; 315/82, 77, 83; 307/112, 113; 324/166, 171, 156, 160, 115

[56] References Cited

U.S. PATENT DOCUMENTS 4,878,387  11/1989  Muramatsu ........................... 73/866.3

FOREIGN PATENT DOCUMENTS

| 3-113125 | 11/1991 | Japan . | |
|---|---|---|---|
| 3-122322 | 12/1991 | Japan . | |
| 407306648A | 11/1995 | Japan | G09F 9/33 |
| 408043142A | 2/1996 | Japan | G01D 1/28 |

*Primary Examiner*—Leo P. Picard
*Assistant Examiner*—Michael Datskovsky
*Attorney, Agent, or Firm*—Finnegan, Henderson, Farabow, Garrett & Dunner, L.L.P.

[57] ABSTRACT

A light leakage preventing structure of a combination meter includes: a plurality of scale plates being arranged so that their edges face each other with a gap being provided therebetween; and a light shielding member to be mounted to rear surfaces of facing portions of the edges. In the structure: the edges of the facing portions of the scale plates are formed into a flat plate shape; and the light shielding member has a dark space opened towards the facing portions.

5 Claims, 4 Drawing Sheets

ILLUMINATED COMBINATION METER

BACKGROUND OF THE INVENTION

1. Field of the Invention

The present invention relates to an illuminated combination meter, more particularly to a light leakage preventing structure for a combination meter in which edges of a facing portion and surfaces of scale plates appear integrated and the manufacturing cost thereof is low.

2. Description of Relevant Art

In a combination meter in which a meter scale plate is constituted so that edges of scale plates divided plurally face each other, as shown in FIG. 1, a gap 106 is provided between edges 105 of the facing portion of the scale plates 104. This is because the edges 105, 105 are prevented from bumping against each other and from being deformed due to thermal expansion and displacement of the scale plates 104. However, when such a gap 106 is provided, illumination lights of the scale plates 104 leak from this gap, and thus the scale plates 104 are hardly seen. In order to prevent this effect, a light leakage preventing structure is provided.

The conventional light leakage preventing structure is such that, as shown in FIG. 1, a bent section 105a is formed at the edge 105 of the scale plate 104, and this bent section 105a is nipped by a channel-shaped light shielding plate 112 as disclosed in the Japanese Utility Model Application Laid-Open No. 3-113125 (1991).

In addition, as shown in FIG. 2, a structure, with a turned edge 113 is provided on upper surfaces of the scale plates 104, namely, surfaces on a side where a needle 107a indicating numerical values is provided. The turned edge structure covers the gap 106 between the facing edges 105, 105 of the scale plates 104, 104.

In the structure with the bent section 105a as shown in FIG. 1, a line or a radius (in case a corner portion is rounded) occurs at a corner portion of the bent section 105a. Since a light is reflected from the surface of the bending section 105a, contrast is generated between the surfaces of the scale plates 104 and gap 106. Therefore, there arises a problem that the appearance of an integral structure is hardly obtained.

In addition, in the structure as shown in FIG. 2, the turned edge 113 is provided on the scale plates 104. This configuration does not provide the appearance that the scale plates face each other. Therefore, there also arises the problem that the appearance of an integral structure is hardly obtained.

SUMMARY OF THE INVENTION

The present invention has been achieved with such points in view, and it is an object of the present invention to provide an illuminated combination meter with a light leakage preventing structure of in which edges of a facing portion and surfaces of scale plates appear integrated and the cost is low.

A first aspect of the present invention provides a light leakage preventing structure for an illuminated combination meter, comprising: a plurality of scale plates being arranged so that their edges face each other with a gap being provided therebetween; and a light shielding member to be mounted to rear surfaces of facing portions of the edges, wherein the edges of the facing portions of the scale plates are formed into a flat plate shape; and the light shielding member has a dark space opened towards the facing portions.

For this reason, according to the first aspect, since a bent section is not provided to the facing edges of the scale plates, a radius or the like does not occur on a surface and a corner portion of the bent section, and only the dark space is seen from the gap. For this reason, the gap is not noticeable, and thus the scale plates seem to be integrated. Moreover, since a bending process is not required, the production cost can be reduced.

According to a second aspect of the present invention, as it depends from the first aspect, there is provided the light leakage preventing structure for an illuminated combination meter in which the light shielding member has an opened edge portion which surrounds the dark space; and the light shielding member is an independent box-shaped parts for bringing the opened edge portion into contact with the rear surfaces of the scale plates.

According to the second aspect, when the opened edge portion of the box-shaped light shielding member is mounted so as to be brought into contact with the rear surfaces of the scale plates, light leakage can be prevented efficiently.

According to a third aspect of the present invention, as it depends from the first aspect, there is provided the light leakage preventing structure for an illuminated combination meter which further comprises a meter case for mounting the plural scale plates, wherein the light shielding member is formed integrally with the meter case; the light shielding member has an opening edge portion which surrounds the dark space; and the light shielding member is formed into a groove shape so that the opening edge portions are brought into contact with the rear surfaces of the scale plates.

According to the third aspect, when the scale plates are placed to be mounted onto the groove-shaped light shielding members which are integral with the meter case, light leakage can be prevented efficiently. Furthermore, the light shielding member as a part independent of the meter case is not required. For this reason, the production cost is low.

BRIEF DESCRIPTION OF THE ACCOMPANYING DRAWINGS

The above and further objects and novel features of the present invention will more fully appear from the following detailed description when the same is read in conjunction with the accompanying drawings.

DETAILED DESCRIPTION OF THE PREFERRED EMBODIMENTS

Figure 1:
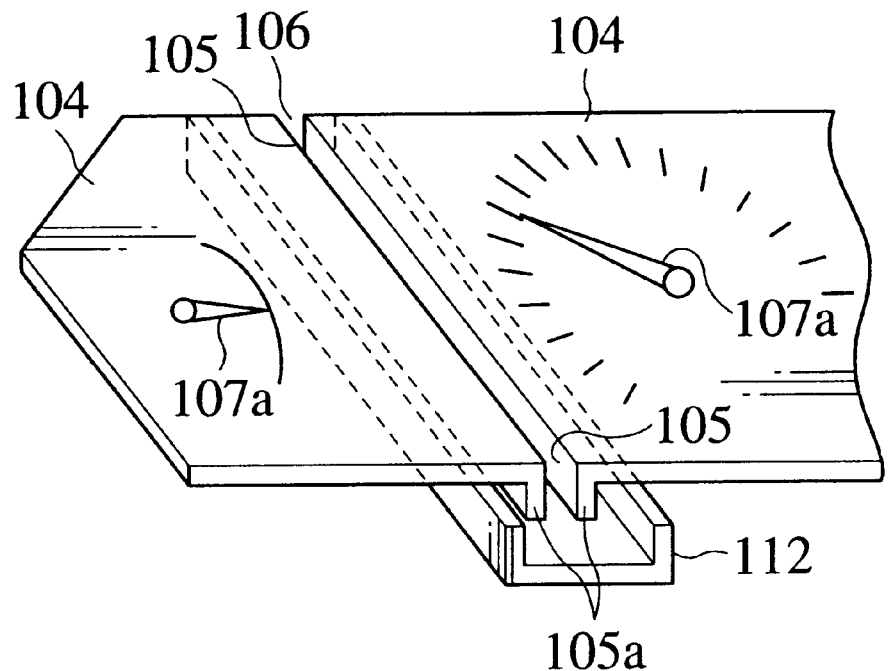
FIG. 1 is a perspective view showing a conventional light leakage preventing structure for a combination meter.

Detailed below are the preferred embodiments of the present invention with reference to the accompanying drawings. Like members are designated by like reference characters.

Figure 3:
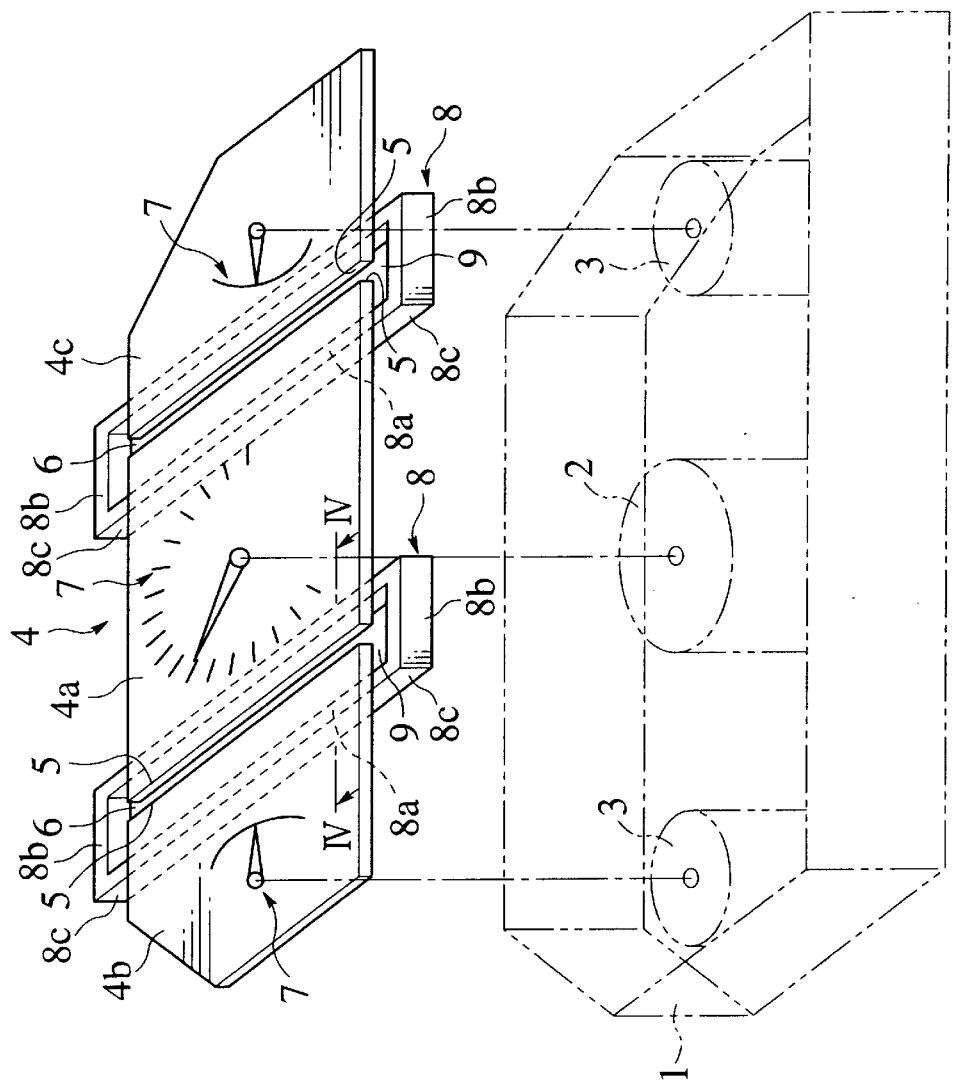
FIG. 3 is an exploded perspective view showing an illuminated combination meter with a light leakage preventing structure according to an embodiment of the present invention.

In FIG. 3, internal machines are provided in a meter case 1 of the illuminated combination meter. More specifically, a speed indicator internal machine 2 is provided to the middle portion, and auxiliary internal machines 3 such as a fuel indicator, a water temperature indicator, and a voltmeter are provided on both sides of the speed indicator.

A meter scale plate 4 mounted to an upper portion of the meter case 1 is composed of a plurality of divided scale plates, namely, a central scale plate 4a, and right and left scale plates 4b and 4c. Edges 5 of the facing portions of the scale plates 4a, 4b and 4c face each other providing a gap 6. Here, a bent section or the like is not formed on the edges 5 of the facing portions, and the edge surface of the flat plate is exposed. A scale design 7 such as a scale and numerals is provided on the scale plates 4a, 4b and 4c.

Light shielding members 8 are mounted to the rear sides of the facing portions of the scale plate 4a, 4b and 4c. The shielding members 8 are long and narrow box-shaped bodies which are composed of side walls 8c longer than that of the meter scale plate and upper and lower side walls 8b. They are arranged so that their opening portions face the lower portions of the gaps 6. The side walls 8c closely contact with the rear surfaces of the scale plates 4a, 4b and 4c.

Figure 4:
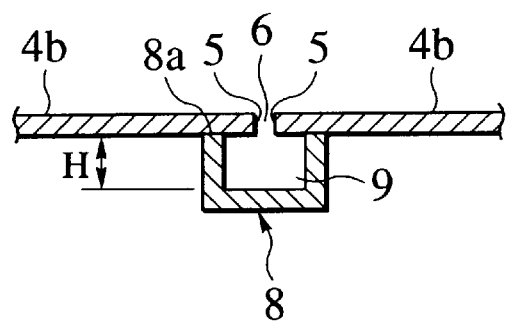
FIG. 4 is a sectional view taken along line IV—IV of FIG. 3.

As shown in FIG. 4, the light shielding members 8 are arranged so that dark spaces 9 have a certain height H (a height such that a bottom surface is not seen from the gap 6). This height H is defined by the distance between the bottom surface of the light shielding member and the rear surface of the scale plates when the side members abut the rear surface of the scale plates. The dark spaces 9 are dark so that lights such as illumination lights of the scale plates and indicators do not come thereinto. Since the bottom surfaces of the light shielding members 8 cannot be seen, any colors such as black and white may be used as the color of the light shielding members 8. Moreover, as shown in FIG. 5, the periphery portions of the scale plates 4 (4a and 4b) are covered with turned edges 15.

Figure 5:
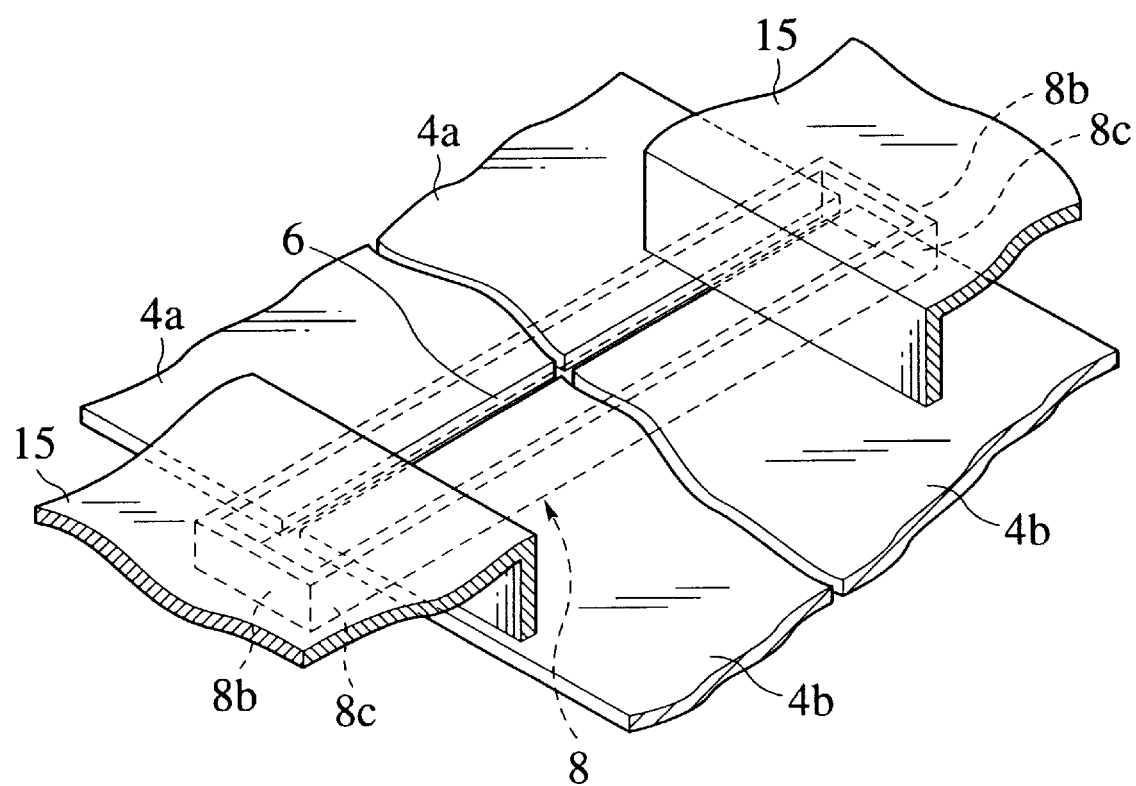
FIG. 5 is a partial perspective view showing a peripheral portion of scale plates.
Figure 6:
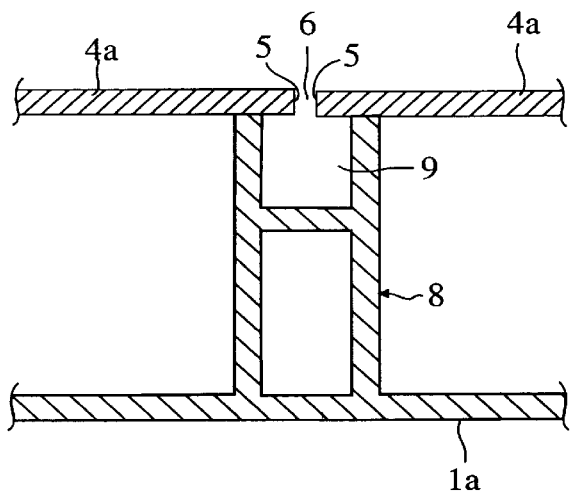
FIG. 6 is a sectional view showing another embodiment.

The light shielding members 8 may be independent parts as shown in FIGS. 3, 4 and 5, or integrated with a bottom section 1a of the meter case 1, (or a side portion of the meter case 1) as shown in FIG. 6. When the light shielding members 8 are formed integrally with the meter case 1, the light shielding members 8 as independent parts are not required. Therefore, the production cost is low.

Figure 2:
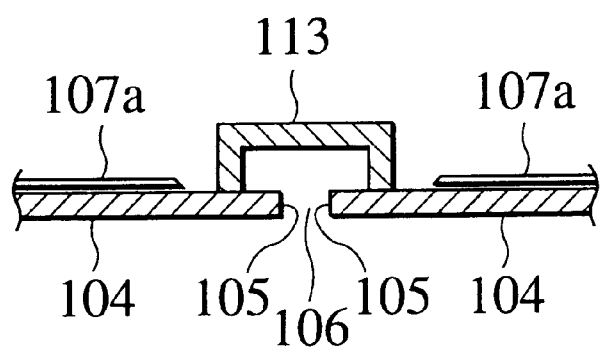
FIG. 2 is a sectional view showing another conventional light leakage preventing structure for a combination meter.
Figures 7A, 7B, 7C, 7D:
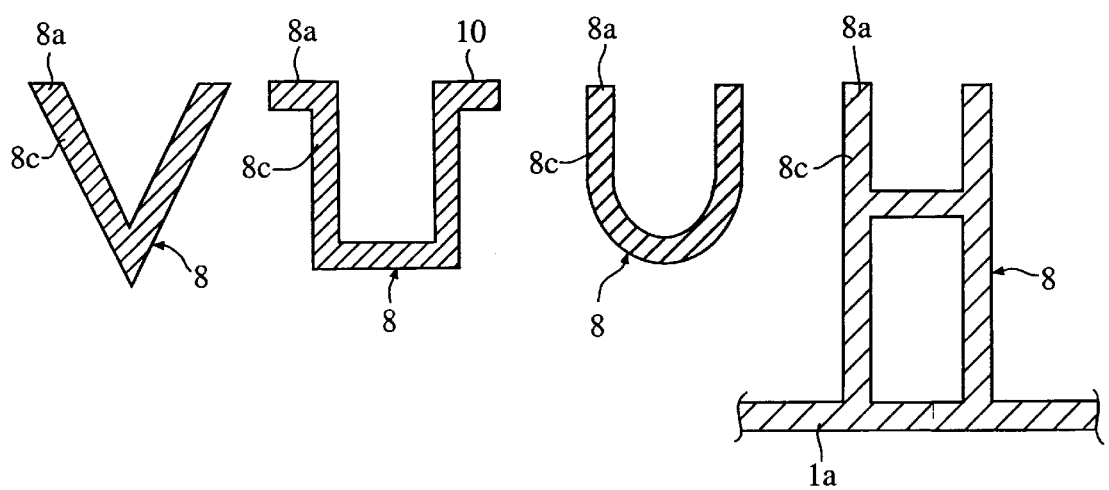
FIGS. 7A, 7B, 7C and 7D are sectional views showing modified examples of a light shielding member.

As illustrated in FIGS. 6 and 7A–D, the light shielding member 8 may comprise two edge walls 8c that form a groove shape. The tops 8a of the edge walls 8c are brought into contact with the rear surfaces of the scale plates 4a, defining the dark space 9, as illustrated in FIG. 6. The sectional shape of the light shielding member 8 is not limited as long as the dark space 9 having a certain height H is provided. It may have shapes shown in FIGS. 7A, 7B, 7C and 7D. FIG. 7A shows V-shaped section, FIG. 7B shows a shape of FIG. 2 where a flange 10 is provided to both sides of its upper edge, FIG. 7C shows a U-shaped section, and FIG. 7D shows a groove-shaped light shielding member which reaches the bottom section 1a of the meter case 1 and is formed integrally with the bottom section 1a.

As mentioned above, according to the present embodiment, since a bent section is not provided to the edges 5 of the facing portions of the scale plates 4a, 4b and 4c, a radius or the like does not occur on the surface and the corner section of the bending portion. At the same time, the light shielding members 8 have the dark spaces 9 respectively, and only the dark spaces 9 are seen from the gaps 6. For this reason, the gaps 6 are not noticeable, and the scale plates 4a, 4b and 4c seem to be integrated. Moreover, since the bending process is not required, the production cost can be reduced.

While preferred embodiments of the present invention have been described using specific terms, such description is for illustrative purposes, and it is to be understood that changes and variations may be made without departing from the spirit or scope of the following claims.

What is claimed is:

1. An illuminated combination meter, comprising:
    a plurality of flat scale plates having a front surface and a back surface subtended by side edges perpendicular to the front and back surfaces, the scale plates being arranged with the side edges of adjacent scale plates in mutually facing relation across a gap between the adjacent scale plates; and
    a meter case for mounting the plural scale plates; and
    a light shielding member formed integrally with the meter case, wherein
    the light shielding member comprises a first and a second edge wall forming a groove shape and brought into contact with the back surfaces of the scale plates to define a dark space behind the back surfaces and behind the gap between the adjacent scale plates.

2. The illuminated combination meter of claim 1, wherein the light shielding member is a V-shaped structure formed by the first and second edge walls, and wherein the first and second edge walls abut the back surfaces of the scale plates to define the dark space.

3. The illuminated combination meter of claim 1, wherein the light shielding member is a channel-shaped structure formed by the first and second edge walls connected by a bottom shielding member, wherein a flange extends from a top edge of the first edge wall and the second edge wall, and wherein the flanges abut the back surfaces of the scale plates to define the dark space.

4. The illuminated combination meter of claim 1, wherein the light shielding member is a U-shaped structure formed by the first and second edge walls, and wherein the members abut the back surfaces of the scale plates to define the dark space.

5. The illuminated combination meter of claim 1, wherein the light shielding member is a channel-shaped structure formed by the first and second edge walls connected by a bottom shielding member, wherein the bottom of the meter case serves as the bottom shielding member, and wherein the first and second edge walls abut the back surfaces of the scale plates to define the dark space.

* * * * *